(12) United States Patent
Nishikawa et al.

(10) Patent No.: US 6,332,509 B1
(45) Date of Patent: Dec. 25, 2001

(54) NOISE REDUCER FOR CONSTRUCTION EQUIPMENT

(75) Inventors: Kenji Nishikawa, Hiratsuka; Haruhiro Tsubota, Fujisawa; Masao Tsujino, Hiratsuka, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/493,254

(22) Filed: Jan. 28, 2000

(30) Foreign Application Priority Data

Jan. 29, 1999 (JP) .................................................. 11-023319

(51) Int. Cl.[7] ............................. F16F 7/00; F16F 15/00
(52) U.S. Cl. ........................... 181/207; 181/209; 181/211
(58) Field of Search .................................... 181/207, 208, 181/209, 211, 286, 290; 105/452; 295/7

(56) References Cited

U.S. PATENT DOCUMENTS

| 4,185,877 | * | 1/1980 | Tanoue et al. ...................... 305/35 R |
| 4,355,578 | * | 10/1982 | Raquet ................................. 104/1 A |
| 5,131,728 | * | 7/1992 | Katoh et al. ...................... 305/35 EB |
| 5,629,503 | * | 5/1997 | Thomasen ............................. 181/199 |
| 5,631,451 | * | 5/1997 | Torisaka et al. .................... 181/207 |
| 5,800,026 | * | 9/1998 | Nagata ................................. 305/46 |

FOREIGN PATENT DOCUMENTS

| 41 41 343 | * | 5/1993 | (DE) .................................... 181/208 |
| 55-174082 | | 12/1980 | (JP) . |
| 406286676 | * | 10/1994 | (JP) ............................. B62D/55/253 |
| 410001077 | * | 1/1998 | (JP) ............................... B62D/55/18 |

* cited by examiner

Primary Examiner—Robert E. Nappi
Assistant Examiner—Edgardo San Martin
(74) Attorney, Agent, or Firm—Armstrong, Westerman, Hattori, McLeland & Naughton, LLP.

(57) ABSTRACT

A noise reducer for construction machinery, which efficiently reduces noise at low cost with durability, is provided. For this purpose, lamination plates (8) which are the plates being laminated are bonded, discretely at a predetermined interval (a1), to a part of or the entire of a noise generating element. Lamination plates (8A, 8E) may be bonded discretely at a plurality of kinds of bonding intervals (a1, a2). The lamination plates (8) with the different number of laminations may be bonded according to a noise generating element.

7 Claims, 11 Drawing Sheets

NOISE REDUCER FOR CONSTRUCTION EQUIPMENT

TECHNICAL FIELD

The present invention relates to a noise reducer for construction equipment, and more particularly, to a device for effectively reducing noise.

BACKGROUND ART

As shown in, for example, FIG. 20A, a method of placing a vibration reducing member 21 of a viscoelastic body such as rubber, resin and the like on a vibrating element (base member) 22 is conventionally known as a noise reduction method for construction equipment. In this method, as shown in FIG. 20B, the vibration reducing member 21 placed on the vibrating element 22 is compulsorily expanded and contracted following the movement of the vibrating element 22, which is vibrating, as shown by the arrows in FIG. 20B. Then, due to the loss determined by the physical properties inside the vibration reducing member 21 in this situation, the vibrational energy is dispersed as thermal energy, thereby producing the effect of reducing vibration.

Further, as another noise reducing method of the prior art, for example, Japanese Utility Model Laid-open No. 55-174082 discloses a shoe plate (crawler belt) of a crawler vehicle, on which underside face a vibration damping means utilizing frictional loss is attached. According to the above, one end side of the vibration damping means (for example, spring steel plate) is fixed on the underside face of the shoe plate with bolts or the like, and the other end side is attached on the shoe plate while it is firmly pressed against the shoe plate (not fixed). When the shoe plate vibrates, due to the friction caused by the displacement of the other end portion of the vibration damping means and the shoe plate, the vibrational energy of the shoe plate rapidly decreases, thereby rapidly damping the vibration.

However, the above conventional noise reducing methods have the following disadvantages.

In the noise reducing method shown in FIG. 20A and FIG. 20B, it is necessary to increase the thickness of the vibration reducing member 21 to produce a higher vibration reducing effect, and it is required that the thickness of the vibration reducing member 21 is more than twice to three times of the plate thickness of the vibrating element 22. In the case of construction equipment, since the vibrating element (base member), to which the noise reducing member is applied, has the plate thickness of more than several millimeters to ten-odd millimeters, the required plate thickness of the vibration reducing member is almost about 10 millimeters to 50 millimeters. Consequently, the vibration reducing member 21 increases in cost due to the thickness as described above, besides being originally expensive since it is made of special material. In addition, in a place where the vibration reducing member 21 is placed, it is necessary to secure a space of a predetermined size in order to avoid interference with the other members, which causes the disadvantage of the device increasing in size. Further, in the case of construction equipment and the like which are used in various sites in the outdoors, there arises the disadvantage that the attaching portion of the vibration reducing member 21 has less durability against the environment (sunlight, weather, and the like), vibration, impact and abrasion (by rocks, stones, sands and the like).

Further, in the vibration damping means described in the embodiments of the shoe plate of the aforesaid Japanese Utility Model Laid-open No. 55-174082, one end side of the spring steel plate formed into a wave-shape is pressed against the shoe plate with bolts or the like to be attached thereto. However, due to the structure in which the plate formed into a wave-shape is fixed at only one end side and pressed against the shoe plate, dirt, sands and the like easily enter the gap between the spring steel plate and the shoe plate. If these sands and the like come into the aforesaid gap, the gap is widened, thereby eliminating or decreasing the loss of vibration caused by the frictional energy, thus causing the disadvantage that the noise reduction effect does not last for a long time. Further, due to the above structure, the spring steel plate is easily deformed by stones, rocks and the like, thus causing the disadvantage of less durability.

SUMMARY OF THE INVENTION

In view of the above conventional disadvantages, an object of the present invention is to provide a noise reducer for construction equipment, which efficiently reduces noise at lower cost with durability.

In order to attain the above object, a first aspect of a noise reducer for construction equipment according to the present invention is characterized by including lamination plates which are the plates being laminated, and characterized by the lamination plates being bonded, discretely at a predetermined interval, to a part of or the entire of a noise generating element of the construction equipment.

According to the above structure, since the lamination plates are discretely bonded to the noise generating element (vibrating element), if the noise generating element vibrates, very small displacements and gaps are generated between the vibrating element and the lamination plates, and between the laminated plates. The very small displacements and the gaps are successively generated while always changing, and therefore friction and collisions are repeatedly caused between the plates as well as between the vibrating element and the lamination plates. Accordingly, the vibrational energy of the noise generating element is converted into thermal energy by the above friction and collisions to be dispersed, therefore making it possible to decrease vibration and reduce noise. In this situation, the laminated plates convert vibrational energy into thermal energy on the principle different from the internal loss of the conventional vibration reducing member of the viscoelastic body, specifically, by the friction and collisions between the plates as described above. As a result, even if each plate of the lamination plates is made thinner and the lamination height is made almost equal to or less than the plate thickness of the original vibration reducing element (base member), a sufficient noise reduction effect can be obtained. Consequently, the noise reducer can be reduced in size. Further, the laminated plate is not made of a special material like the vibration reducing member, but it may be made of a material with a friction coefficient of more than a predetermined value, such as a plain steel plate, aluminum, stainless steel or FRP (reinforced plastic material), therefore making it possible to reduce cost and improve durability.

A second aspect of a noise reducer for construction equipment according to the present invention is characterized by including lamination plates which are the plates being laminated, and is characterized by the lamination plates being bonded, discretely at a plurality of kinds of bonding intervals, to a part of or the entire of a noise generating element of the construction equipment.

According to the above structure, since the lamination plates are discretely bonded to the noise generating element (vibrating element), if the noise generating element vibrates, very small displacements and gaps are generated between the vibrating element and the lamination plates, and between the laminated plates. The very small displacements and the gaps are successively generated while always changing, and therefore friction and collisions are repeatedly caused between the plates as well as between the vibrating element and the lamination plates. Accordingly, the vibrational energy of the noise generating element is converted into thermal energy by the above friction and collisions to be dispersed, therefore making it possible to decrease vibration and reduce noise. In this situation, if the bond interval of the lamination plates is made larger, noise in the low frequency band is further reduced, and if the bond interval is made smaller, noise in the high frequency band is further reduced, thus making it possible to set the frequency band of the noise to be reduced by changing the bond interval. Consequently, by properly setting the bond interval of the lamination plates so as to obtain the highest vibration reducing effect in accordance with the frequency band of the noise generated in the noise generating element and the generation level, the noise level is effectively reduced all over the entire frequency band.

Further, in the above first or second aspects of the invention, the number of laminations of the lamination plates may vary according to the noise generating element.

According to the above configuration, if the number of laminations is increased, the amount of reduction of noise level all over the entire frequency band increases, and therefore by bonding the lamination plates with the different number of laminations according to the noise level of the noise generated in the noise generating element, a desired amount of noise level reduction can be obtained. Thereby noise can be effectively reduced in accordance with the noise generating element.

BRIEF DESCRIPTION OF THE DRAWINGS

FIG. 5A shows a non-vibrating state, and FIG. 5B shows a vibrating state;

FIG. 20A shows a non-vibrating state, and FIG. 20B shows a vibrating state.

BEST MODE FOR CARRYING OUT THE INVENTION

Preferred embodiments of a noise reducer for construction equipment according to the present invention will be explained in detail below with reference to FIG. 1 through FIG. 15. In a first embodiment to a seventh embodiment, examples in which the noise reducer is applied to a crawler plate of a crawler belt of construction equipment will be explained.

Figure 1:
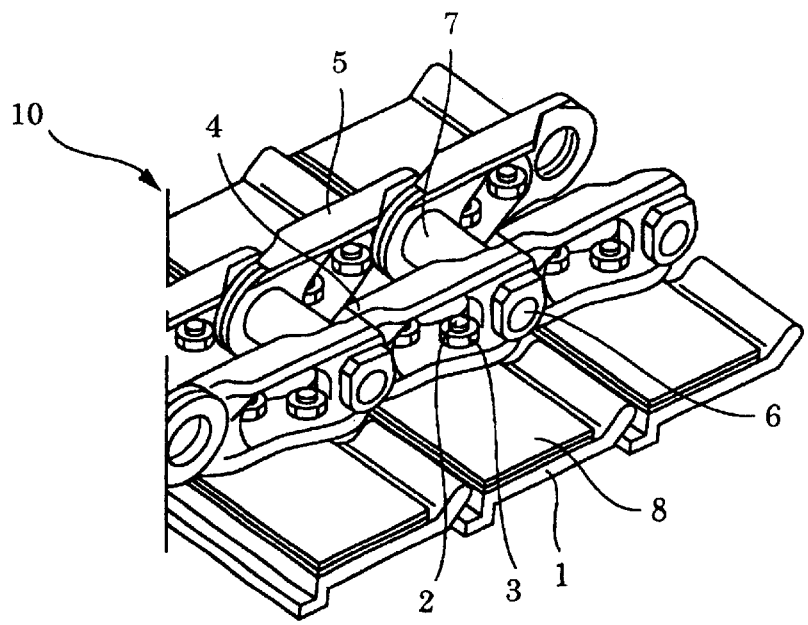
FIG. 1 is a perspective view of a crawler belt of a first embodiment to which a noise reducer for construction equipment according to the present invention is applied.
Figure 2:
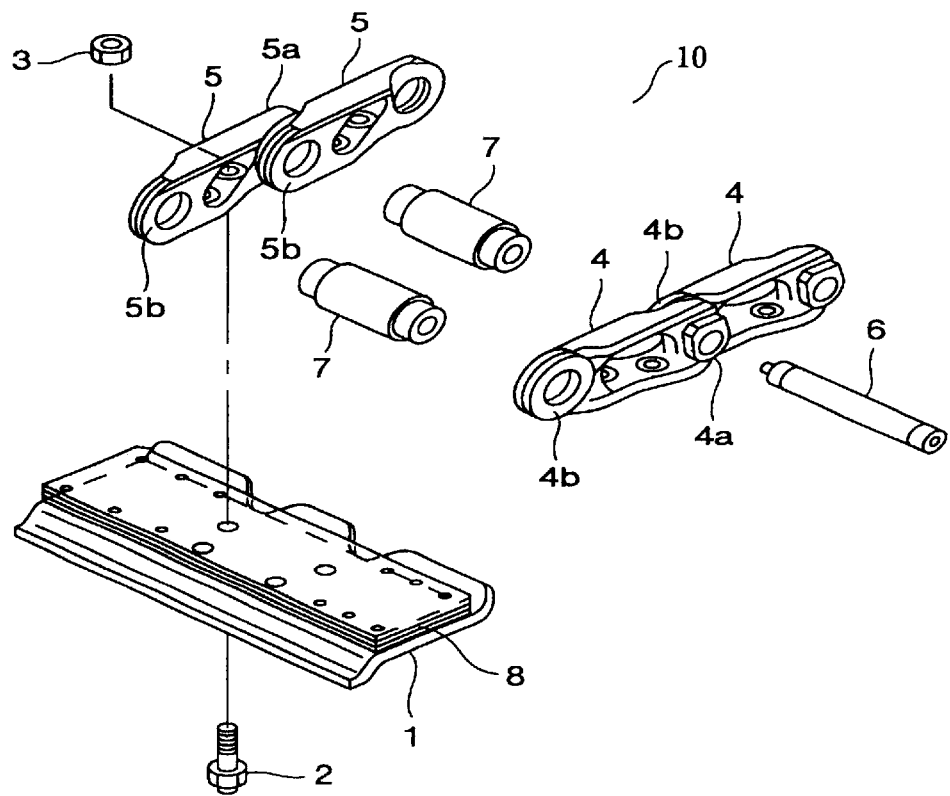
FIG. 2 is an explanatory view of a structure of the crawler belt of the first embodiment.

First, the first embodiment will be explained with reference to FIG. 1 through FIG. 8. FIG. 1 is a perspective view of the crawler belt, and FIG. 2 is a block diagram of the crawler belt. As shown in FIGS. 1 and 2, a crawler belt 10 is constructed by clamping a crawler plate 1, to which a lamination plate 8 is bonded, to left and right links 4 and 5 with a bolt 2 and a nut 3. The left and right links 4 and 5 have outside link elements 4a and 5a respectively at one end sides, and inside link elements 4b and 5b respectively at the other end sides. The left and right links 4 and 5 are coupled to be bendable by means of a bush 7 fixed between the inside link elements 4b and 5b at one ends of the left and right links 4 and 5, and a pin 6 inserted in the bush 7 and fixed to the outside link elements 4a and 5a at the other ends of the adjacent left and right links 4 and 5 to be in a form without ends.

Figure 3:
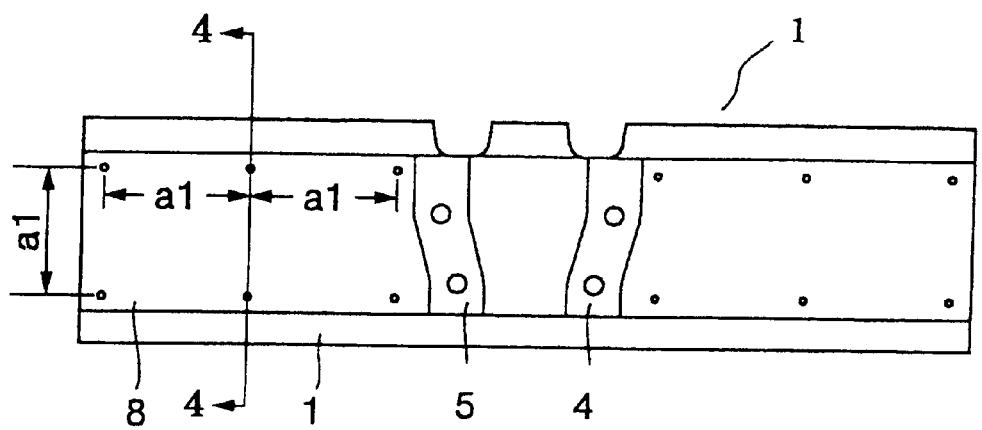
FIG. 3 is a plan view of a crawler plate of the first embodiment.
Figure 4:
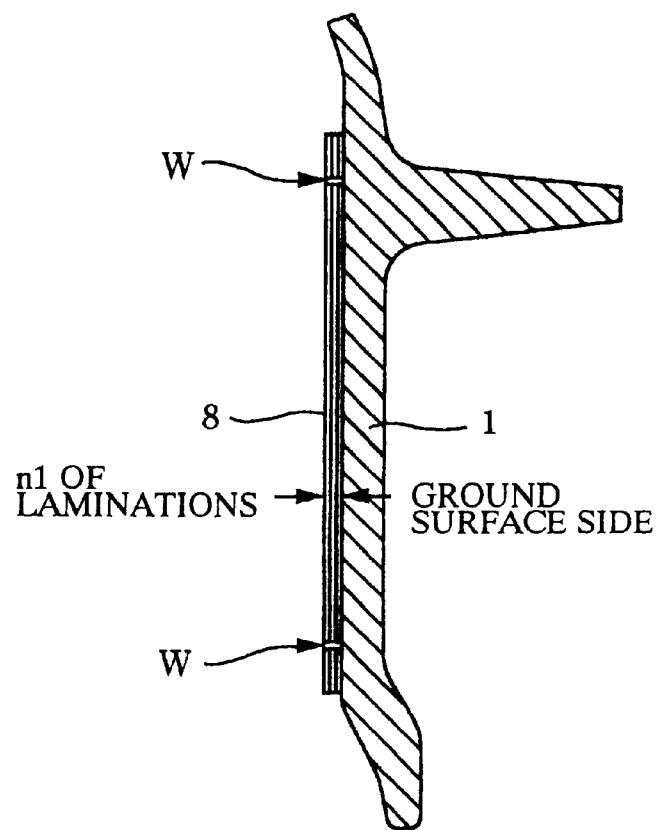
FIG. 4 is a sectional view taken along the 4—4 line in FIG. 3.

FIG. 3 is a plan view of the crawler plate 1, and FIG. 4 is a sectional view taken along the 4—4 line in FIG. 3. As shown in FIGS. 3 and 4, a predetermined number n1 of the thin plain steel plates 8 (hereinafter called the lamination plates 8) are laminated on the underside (namely, the side opposite to a ground side surface) of each of the crawler plate 1. The n1 of lamination plates 8 are bonded to the crawler plate 1 at a plurality of positions at a bond interval a1 by plug welding W. The n1 of lamination plates 8 and the crawler plate 1 are clamped together to the left and right links 4 and 5 by means of the aforesaid bolts 2 and nuts 3. As for the state of the lamination plates 8 before they are bonded to the crawler plate 1, the lamination plates 8 may be configured in such a manner that the n1 of lamination plates 8 are separate from one another, or the n1 of lamination plates 8 are bonded at a plurality of spots to be laminated.

Figure 5A:
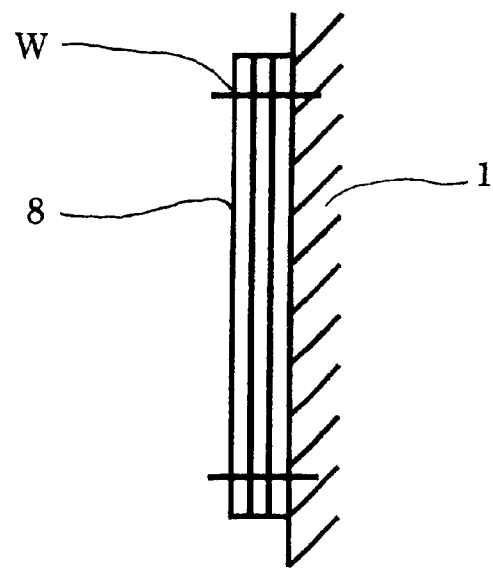
FIG. 5A and FIG. 5B are views explaining the behavior of lamination plates of the first embodiment.
Figure 5B:
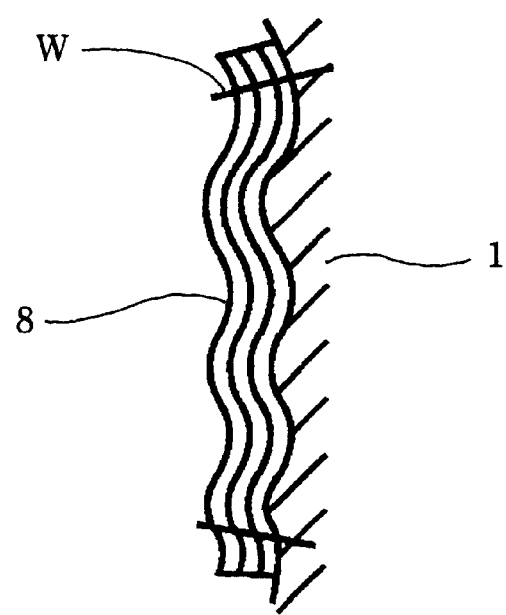
Figure 6:
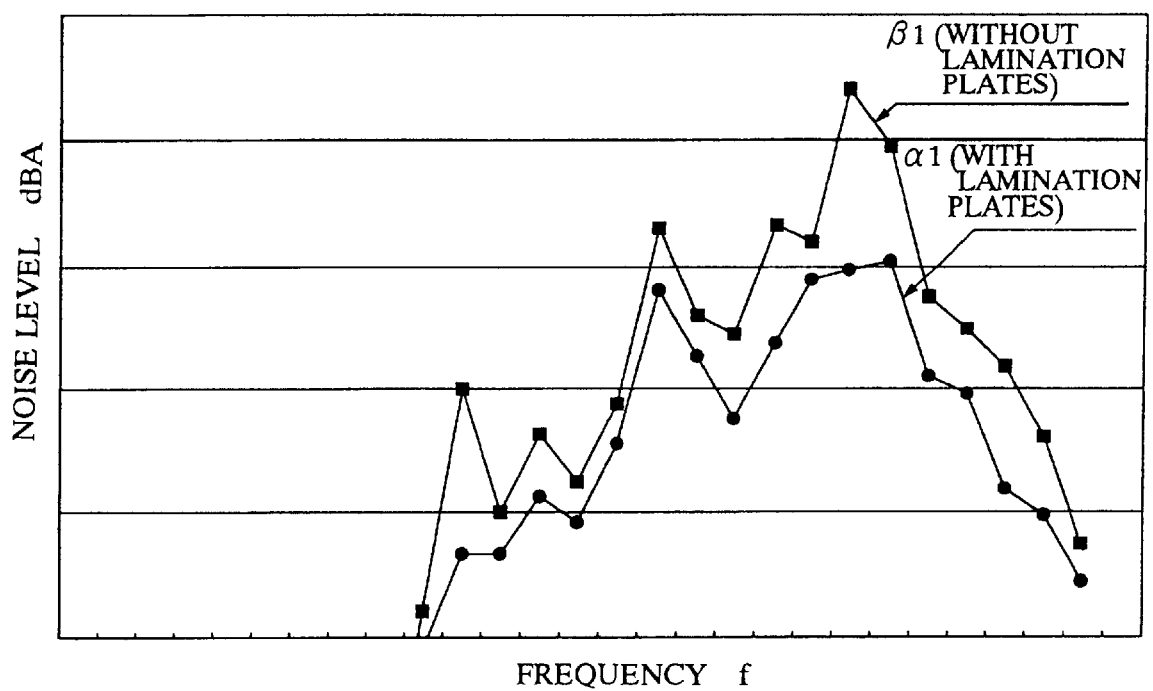
FIG. 6 is a graph showing noise levels with and without the lamination plates of the first embodiment.

Next, the operation will be explained based on FIG. 5A, FIG. 5B, and FIG. 6. FIG. 5A shows a state of the lamination plates 8 which are not vibrating, while FIG. 5B shows a state of the lamination plates 8 which are vibrating. FIG. 6 shows the noise levels with and without the lamination plates 8.

As shown in FIG. 5B, when the crawler plate 1 vibrates, each of the lamination plates 8 in the state shown in FIG. 5A vibrates in accordance with the restrained conditions such as a bond interval, and very small displacements or gaps occur between the plates. Following the vibration, the very small displacements and the gaps successively occur while always changing, and therefore friction and collisions repeatedly occur between the plates. Then, the vibrational energy of the crawler plate 1 is converted into thermal energy as a result of the friction and collisions to disperse. Thereby, the vibration of the crawler plate 1 can be decreased, thus making it possible to reduce noise emitted from the crawler plate 1.

The inventors confirm a noise reducing effect with use of the lamination plates as a result of experiments, and the experiment results are shown in FIG. 6. Lines a $\alpha 1$ and $\beta 1$ shown in FIG. 6 respectively show the noise levels relative to the frequency with and without the lamination plates. As shown in FIG. 6, in a case with the lamination plates, the noise levels are reduced in the entire frequency band as compared with a case without the lamination plates, and it can be found that the lamination plates have a very high degree of effectiveness in reducing noise.

Figure 7:
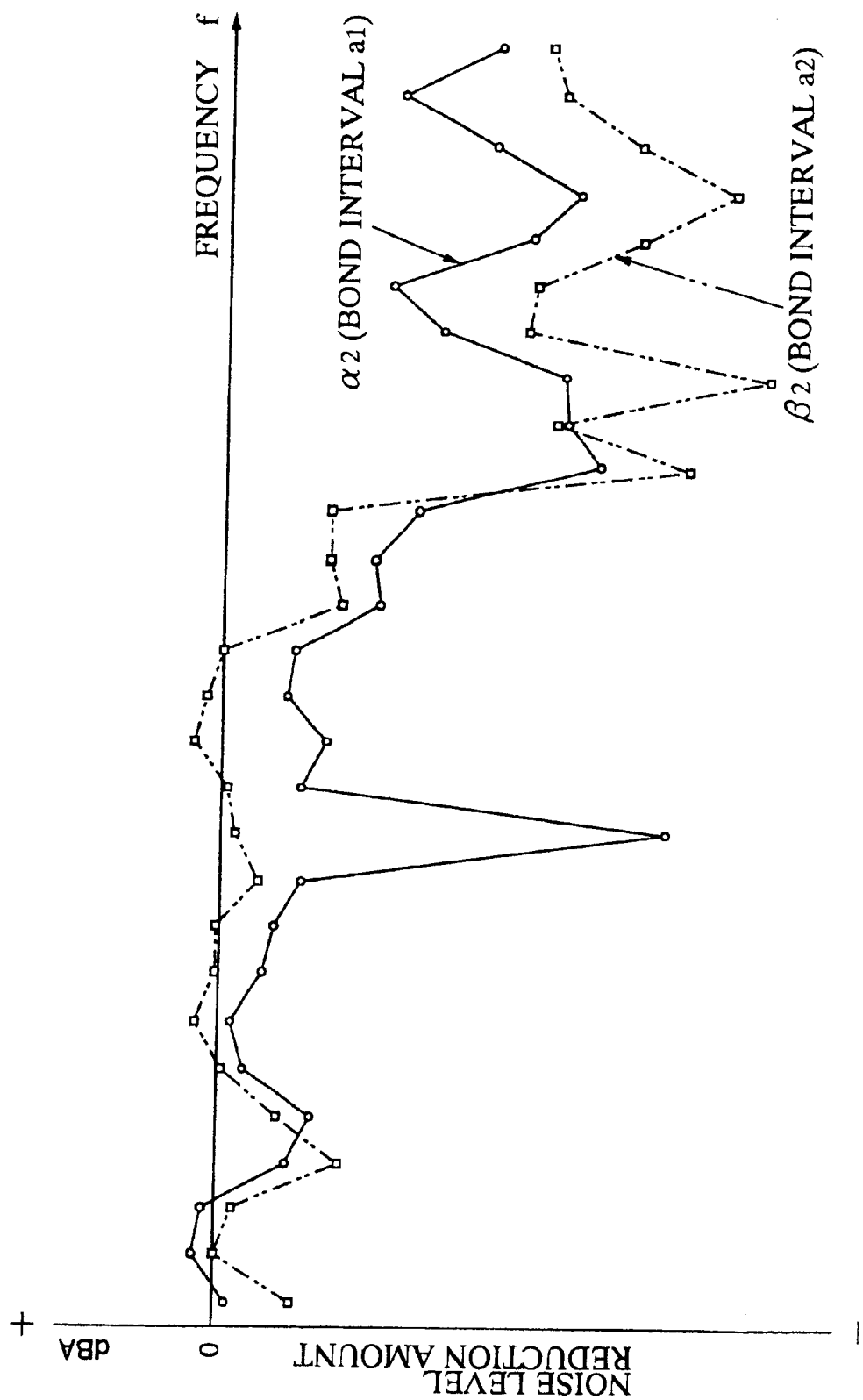
FIG. 7 is a graph showing the amount of noise level reduction when a bond interval of the lamination plates of the first embodiment is changed.

FIG. 7 shows the amounts of noise level reduction when the bond interval of the lamination plates 8 is changed. Here, the amount of noise level reduction shown by the vertical axis is assumed to be "the noise level with the lamination plates minus the noise level without the lamination plates". Hence the amounts of reduction in negative figures indicate a higher reduction effect. Ditto for the below. Lines $\alpha 2$ and $\beta 2$ in FIG. 7 show the amounts of noise level reduction relative to the frequency when the lamination plates 8 are bonded to the crawler plate 1 with the bond intervals being set at a1 and a2 respectively (Note that a1>a2).

As shown in FIG. 7, when the bond interval is larger (the interval a1), higher noise reduction effect is obtained in the low to medium frequency band, and when the bond interval is smaller (the interval a2), higher noise reduction effect is obtained in the medium to high frequency band. In this way, by changing the bond interval, the noise in a predetermined frequency band can be reduced.

Figure 8:
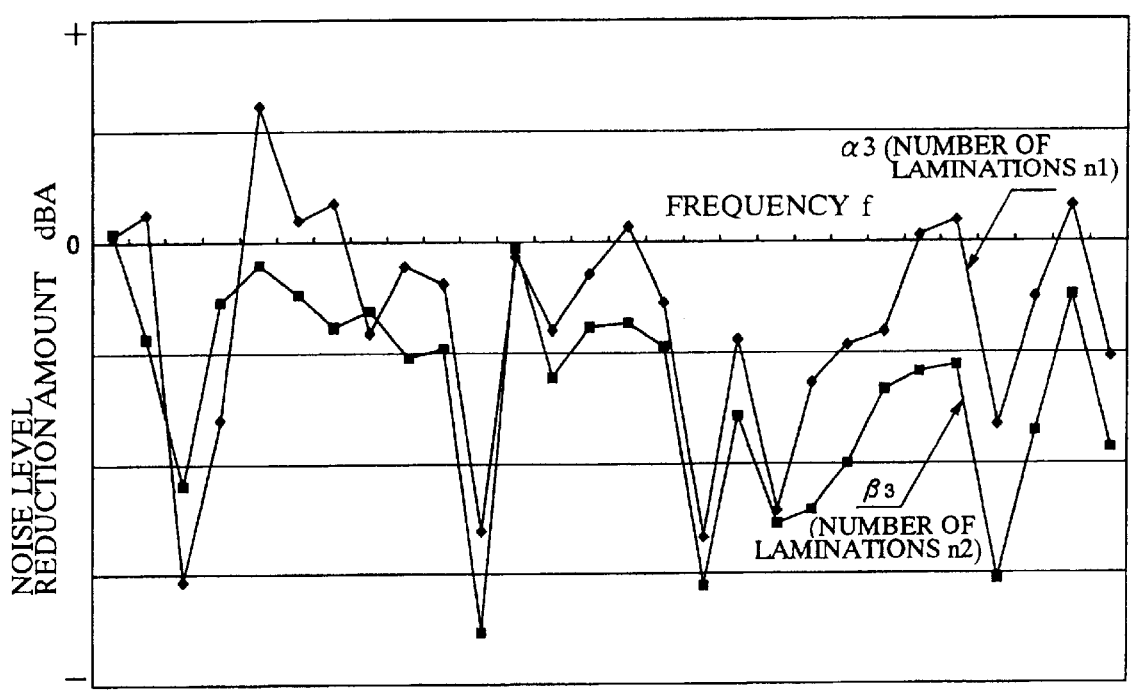
FIG. 8 is a graph showing the amount of noise level reduction when the number of laminations of the lamination plates of the first embodiment is changed.

FIG. 8 shows the noise levels when the number of laminations of the lamination plates 8 is changed. Lines $\alpha 3$ and $\beta 3$ shown in FIG. 8 show the amounts of noise level reduction relative to frequency when the lamination plates 8 with the number of laminations being set at n1 and n2 respectively (Note that n1<n2) are bonded to the crawler plate 1. As shown in FIG. 8, with a large number of laminations (the number of laminations n2), the noise levels become lower across almost the entire frequency band except for part of the low frequency band.

According to the aforesaid first embodiment, by bonding the lamination plates 8 to the crawler plate 1, as shown in FIG. 6, the vibrational energy is dispersed by friction and collisions of the lamination plates 8 to thereby reduce noise by a large amount. In addition, an inexpensive plain steel plate can be used without using an expensive vibration reducing member 21 as in the prior art, therefore reducing the cost, and obtaining higher durability. Further, as shown in FIGS. 7 and 8, the noise frequency band to be reduced can be adjusted with the bond interval of the lamination plates 8, and the noise levels can be adjusted according to the number of laminations, therefore making it possible to efficiently reduce noise minutely in accordance with various vibrating states of the crawler plate 1.

Figure 9:
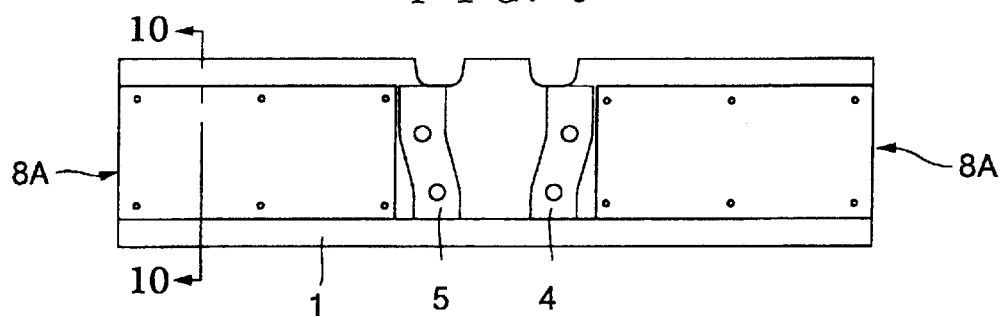
FIG. 9 is a plan view of a crawler plate of a second embodiment to which the noise reducer for the construction equipment according to the present invention is applied.
Figure 10:
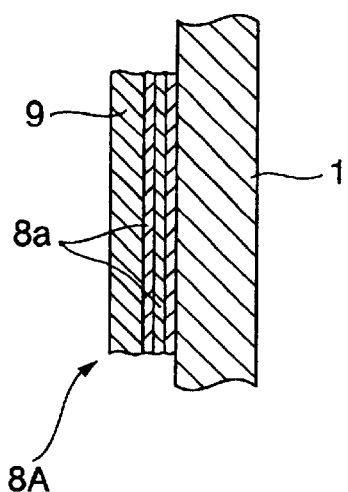
FIG. 10 is a sectional view taken along the 10—10 line in FIG. 9.

A second embodiment will be explained based on FIGS. 9 and 10. FIG. 9 is a plan view of the crawler plate 1 according to the second embodiment, and FIG. 10 is a sectional view taken along the 10—10 line in FIG. 9. Laminated elements 8A and 8A are separately disposed in a longitudinal direction (left and right in FIG. 9) of the crawler plate 1 with the left and right links 4 and 5 therebetween. Each of the laminated elements 8A is composed of a predetermined number of thin lamination plates 8a and a thick lamination plate 9 as shown in FIG. 10, and the thin lamination plates 8a are firmly sandwiched between the crawler plate 1 and the thick lamination plate 9 to be fixed thereto by a bonding means as in the first embodiment.

According to the above structure, the similar effects as in the aforesaid first embodiment are obtained. In addition, since the clamping force is increased by the thick lamination plate 9, the frictional force between the lamination plates 8a increases, thereby increasing dispersing energy caused by friction and making it possible to obtain higher noise reduction effect. Further, by using the thick lamination plate 9 on the outer side, namely, at the uppermost portion, the laminated element 8A is difficult to be deformed or damaged by rocks, stones or the like, and even if it is worn, a large clamping force can be maintained for an extended period of time, therefore making it possible to increase durability of the laminated element 8A.

Figure 11:
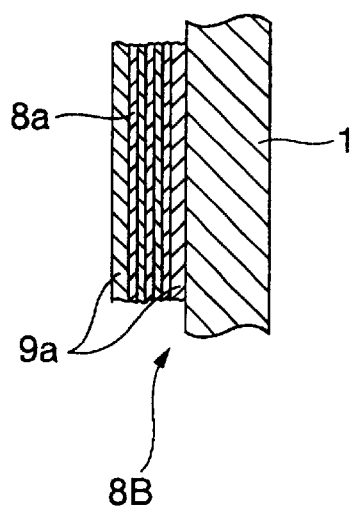
FIG. 11 is a sectional view of a crawler plate of a third embodiment to which the noise reducer for the construction equipment according to the present invention is applied.

With reference to FIG. 11, a third embodiment will be explained. FIG. 11 is a sectional view of a crawler plate according to the third embodiment. As shown in FIG. 11, a laminated element 8B includes a predetermined number of thin lamination plates 8a and two thick lamination plates 9a and 9a, between which the predetermined number of thin lamination plates 8a are firmly sandwiched, and all of them are bonded to the crawler plate 1 by means of the bonding means as in the aforesaid embodiments. Such laminated element 8B is used in the same manner as shown in the aforesaid first or the second embodiment.

According to the structure of the third embodiment, the same effects as in the above first and second embodiment can be obtained, and the clamping force is further increased by clamping the lamination plates 8a between the thick lamination plates 9a and 9a, thus further increasing the frictional force between the lamination plates 8a. Consequently, the vibration dispersing energy caused by the friction is increased, therefore making it possible to further increase the noise reduction effect.

Figure 12:
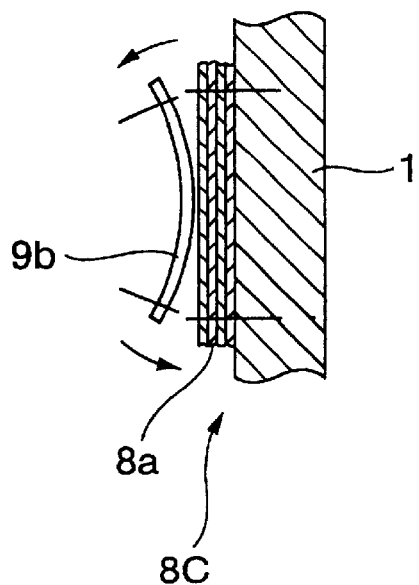
FIG. 12 is a sectional view of a crawler plate of a fourth embodiment to which the noise reducer for the construction equipment according to the present invention is applied.

Subsequently, a fourth embodiment will be explained based on FIG. 12. FIG. 12 is a sectional view of a crawler plate according to the fourth embodiment. As shown in FIG. 12, a laminated element 8C includes a predetermined number of thin lamination plates 8a and a thick lamination plate 9b to which a predetermined bending deformation is previously applied, and the thin lamination plates 8a are firmly sandwiched between the thick laminate plate 9b and the crawler plate 1. The thin lamination plates 8a are bonded with the aforesaid bonding means with the thin lamination plates 8a being compulsorily pressed against the crawler plate 1 by the force of pressure by the aforesaid bending deformation which the thick lamination plate 9b has. The laminated element 8C is used in the same manner as in the first or the second embodiment.

According to the fourth embodiment, the same effects as in the above first and second embodiment can be obtained, and a pre-load is given by the thick lamination plate 9b having the force of pressure, therefore increasing the frictional force between the thin lamination plates 8a. Consequently, the vibration dispersing energy caused by friction is increased, and higher noise reduction effect can be obtained.

Figure 13:
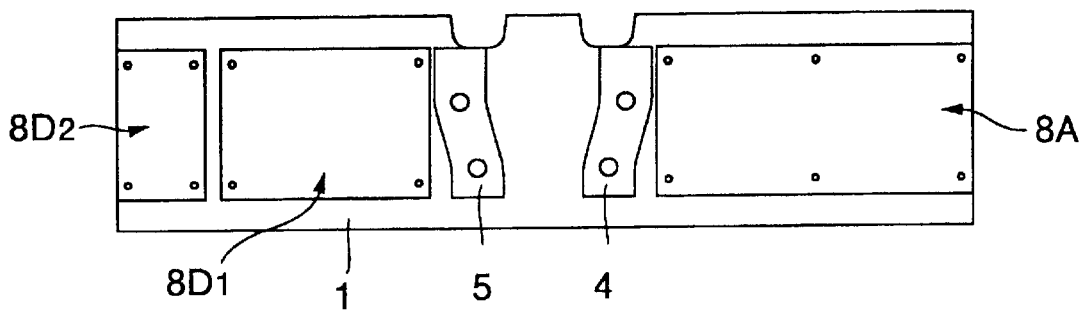
FIG. 13 is a plan view of a crawler plate of a fifth embodiment to which the noise reducer for the construction equipment according to the present invention is applied.

A fifth embodiment will be explained with reference to FIG. 13. FIG. 13 is a plan view of the crawler plate 1 to which laminated elements 8A, 8D1, 8D2 according to the fifth embodiment are bonded. As shown in FIG. 13, on the crawler plate 1, the laminated element 8A, the laminated elements 8D1 and 8D2 in predetermined shapes are separately placed at a plurality of positions. The laminated element 8A is bonded to the crawler plate 1 at either one of the left and right side of the left and right links 4 and 5, and at the opposite side, the laminated elements 8D1 and 8D2 are bonded at two positions. Various kinds of lamination plates shown in the above embodiments are used as these laminated elements 8A, 8D1, and 8D2.

According to the above fifth embodiment, besides the operation and effects in each of the above embodiments, the lamination plates of various sizes and shapes are separately bonded at the predetermined positions, thereby making it possible to minutely cope with the respective shapes of and vibration properties of the particular portions of the crawler plate 1 (corresponding to the aforesaid base member). Specifically, the lamination plates of predetermined sizes and shapes and with predetermined lamination forms can be bonded to the required positions according to the shapes of the parts and vibration properties of the object of which vibration is to be reduced. Further, by changing the bond interval of each laminated element according to the frequency band of the noise caused at a portion of which vibration is to be reduced, the vibration of each portion can be effectively reduced. Thereby, the vibration to be reduced can be minutely and efficiently reduced, and a higher noise reduction effect can be obtained.

Figure 14:
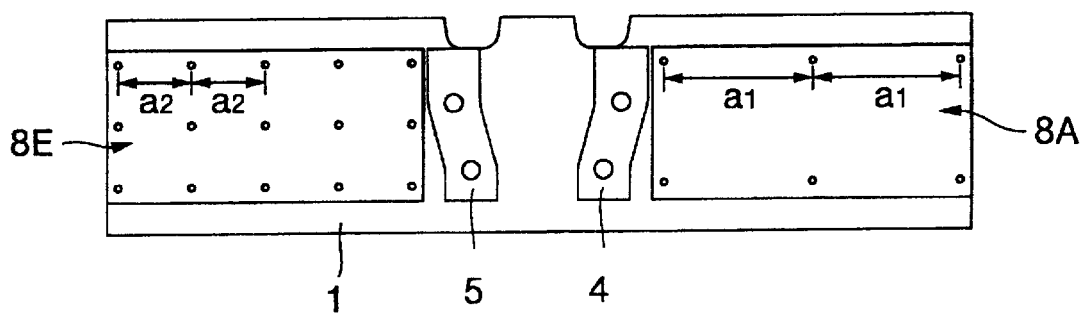
FIG. 14 is a plan view of a crawler plate of a sixth embodiment to which the noise reducer for the construction equipment according to the present invention is applied.

With reference to FIG. 14, a sixth embodiment will be explained. FIG. 14 is a plan view of the crawler plate 1 to which laminated elements 8E and 8A according to the sixth embodiment are bonded. As shown in FIG. 14, plural kinds of laminated elements each with a different bond interval to the crawler plate 1 are placed on the crawler plate 1. In the sixth embodiment, the laminated element 8A having a larger bond interval a1 and the laminated element 8E having a smaller bond interval a2 are provided. In the same laminated element, different bond intervals may be included by changing the bond interval in a longitudinal and lateral direction of the crawler plate, by changing the bond interval in stages, by further making the bond interval an irregular pitch, or the like.

According to the above sixth embodiment, it becomes possible to set a bond interval according to the vibration property of a particular portion of the crawler plate 1, specifically, the noise frequency property, thereby making it possible to adjust the noise reduction frequency band and provide laminated elements. Accordingly, efficient noise reduction can be made for each portion of the crawler plate 1. By providing a plurality of laminated elements with different bond intervals in combination, all of their frequency properties can be combined, and thus minute noise reduction can be made in accordance with the shape and vibration property of the crawler plate 1.

Figure 15:
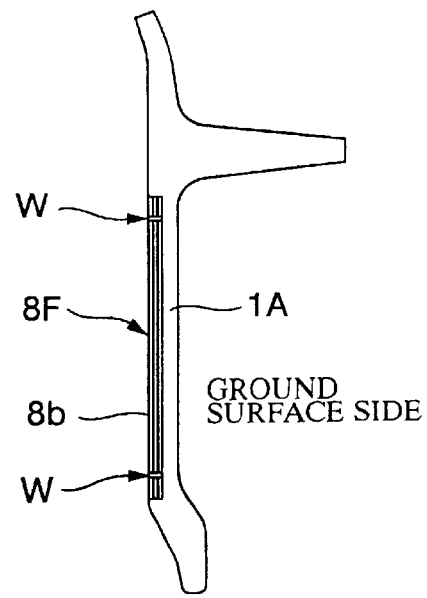
FIG. 15 is a sectional view of a crawler plate of a seventh embodiment to which the noise reducer for the construction equipment according to the present invention is applied.

Based on FIG. 15, a seventh embodiment will be explained. FIG. 15 is a sectional view of a crawler plate 1A to which a laminated element 8F according to the seventh embodiment is bonded. As shown in FIG. 15, a recess is provided on the side opposite to the ground side surface of the crawler plate 1A, lamination plates 8b are placed in the recess to be bonded with the same bonding means as in the above embodiments. As the lamination plates 8b, the lamination plates as in the above embodiments are used.

According to the above seventh embodiment, it is possible to reduce the weight of the crawler plate 1A, and since the lamination plates 8b are placed in the recess, they are seldom damaged by rocks, stones, or the like, thus improving durability. The other effects are the same as in the aforesaid first embodiment, and the explanation will be omitted.

Figure 16:
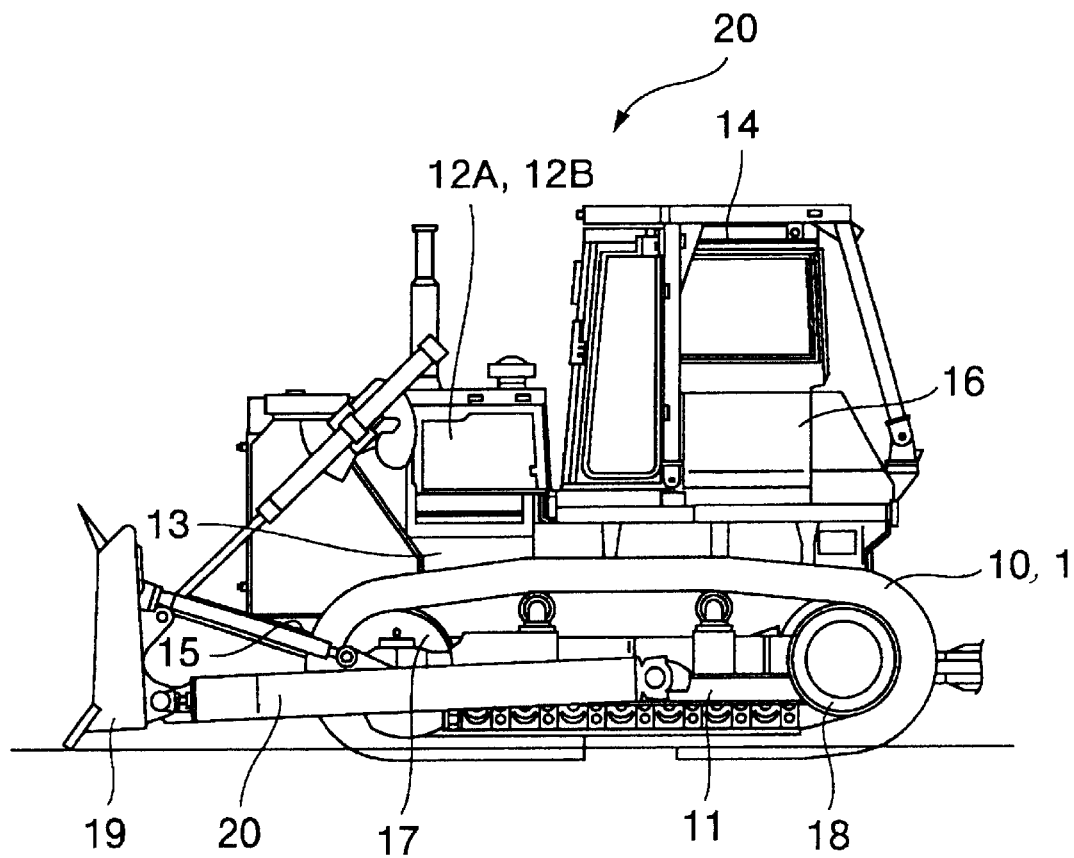
FIG. 16 is a side view of a bulldozer to which the present invention is applied.

As shown in FIG. 16, in construction equipment, for example, a bulldozer 20, there are various components making a noise due to vibration other than the crawler plate 1 of the crawler belt 10. These components include, for example, a truck frame 11, engine room covers 12A and 12B, a main frame 13, an operator's cab 14, an under guard 15, a fender cover 16, a front idler 17, a final drive carrier 18, a blade 19 and a blade supporting frame 20 and the like. The lamination plates according to the present invention are applicable to these components 11 to 20. In an eighth, ninth, and tenth embodiment below, examples in which the lamination plates are applied to the truck frame 11, the engine room covers 12A and 12B, and the front idler 17 will be explained.

Figure 17:
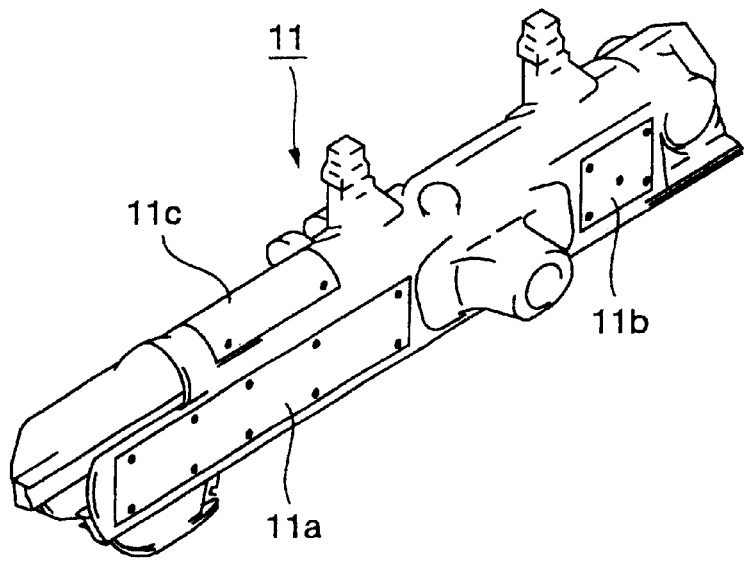
FIG. 17 is a view showing an eighth embodiment in which the noise reducer for the construction equipment according to the present invention is applied to a truck frame.

FIG. 17 shows the eighth embodiment in which the lamination plates are applied to the truck frame 11. As shown in FIG. 17, plane lamination plates 11a and 11b are bonded to a side surface of the truck frame 11, and a curved lamination plate 11c is bonded to the top surface thereof. Though not illustrated, the lamination plate can be bonded to an inner surface of the truck frame 11. For the lamination plates 11a, 11b, and 11c, various kinds of lamination plates explained in the above embodiments can be used in combination.

The truck frame 11 is the area to which large vibromotive force is, directly or indirectly via the crawler belt 10, transmitted as a result of collision against rocks, stones, dirt and sands, and at the same time, it directly touches rocks and stones. Consequently, according to the aforesaid lamination plates 11a, 11b, and 11c, the lamination plate suitable for each vibration property can be used according to the size and the shape of a required portion, therefore making it possible to easily obtain a higher noise reduction effect and to secure durability.

Figure 18:
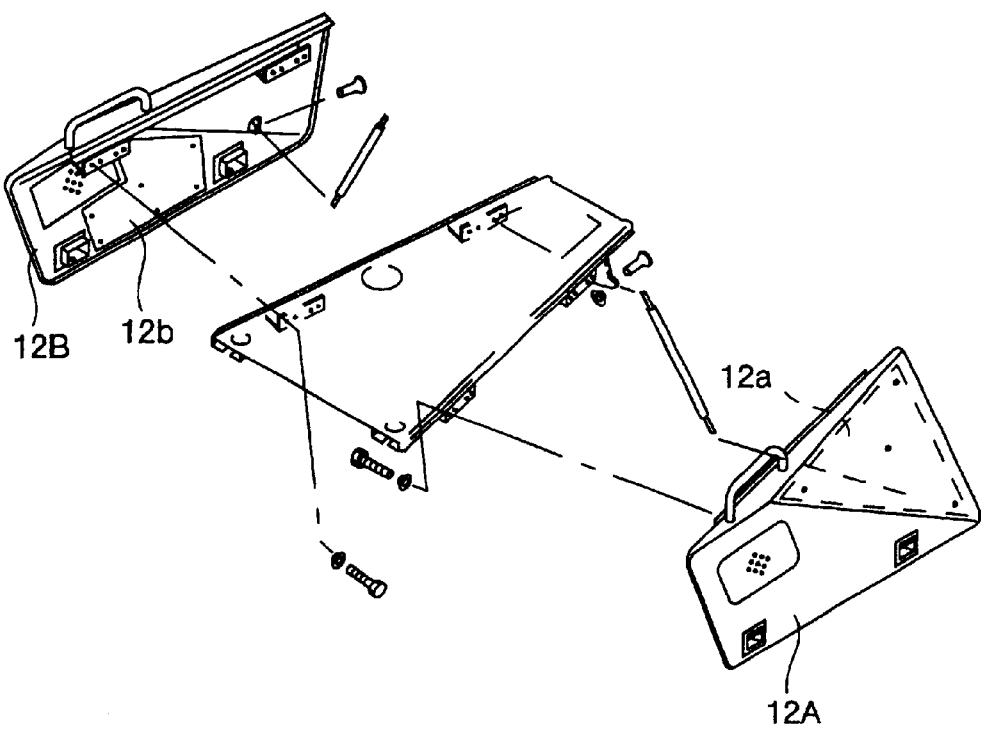
FIG. 18 is a view showing a ninth embodiment in which the noise reducer for the construction equipment according to the present invention is applied to an engine room cover.

FIG. 18 shows the ninth embodiment in which the lamination plates are applied to the engine room covers 12A and 12B. As shown in FIG. 18, lamination plates 12a and 12b in indeterminate forms are bonded to inner surfaces of the engine room covers 12A and 12B. For the lamination plates 12a and 12b, the various kinds of lamination plates explained in the above embodiments can be used in combination.

The engine room covers 12A and 12B are the areas where the vibromotive force due to the mount of an engine not illustrated is transmitted via the main frame 13 (See FIG. 16), and they are in the complicated shapes. Accordingly, the lamination plates 12a and 12b as described above can be easily applied to the components in various shapes, thus making it possible to surely reduce noise. In the case of the ninth embodiment, a heavy load is not exerted on the application areas, therefore the material of each of the lamination plates is not limited to a steel plate, and such materials as have the skin-friction coefficient of more than a predetermined value, for example, aluminum, stainless steel, or FRP (reinforced plastic material) can be used.

Figure 19:
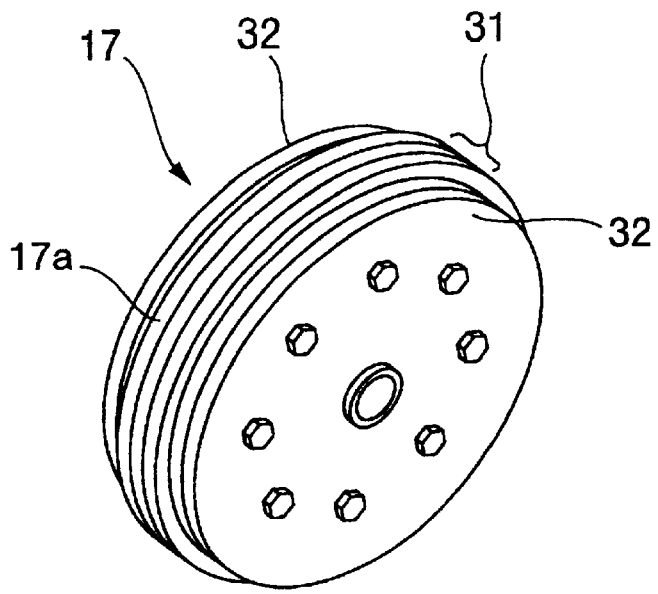
FIG. 19 is a view showing a tenth embodiment in which the noise reducer for the construction equipment according to the present invention is applied to a front idler.
Figure 20A:
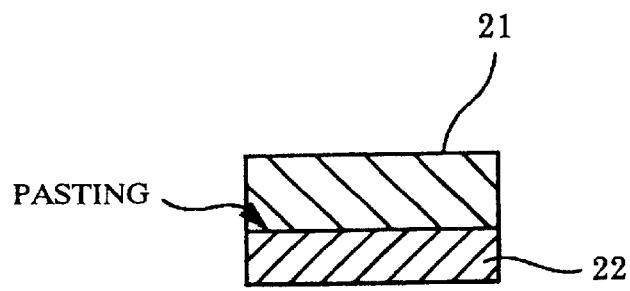
FIG. 20A and FIG. 20B are views explaining the behaviors of a conventional vibration reducing member.
Figure 20B:
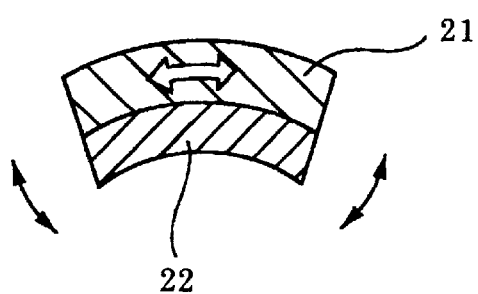

Based on FIG. 19, the tenth embodiment in which the front idler 17 consists of a lamination plate 17a will be explained. As shown in FIG. 19, in the tenth embodiment, the entire front idler 17 consists of the lamination plate 17a, and the lamination plate 17a consists of a plurality of steel plates of a predetermined thickness. The lamination plate 17a consists of a plurality of members 31 with a larger diameter, positioned in the middle of the lamination in a laminating direction, and a plurality of members 32 with a small diameter, positioned at the outside of the members 31, and is clamped with a plurality of bolts at predetermined bond intervals.

According to the above structure, since the entire front idler 17 consists of the lamination plate 17a, the vibration generated in the front idler 17 is reduced by the friction between the plates of the lamination plate 17a, and thus the generated noise can be efficiently reduced. Consequently, the entire thickness can be decreased as compared with the front idler with the conventional noise reducing member being placed thereon, thus enabling reduction in size.

Though the detailed explanation is omitted, besides the above components, the lamination plates can be applied to the components shown in FIG. 16, such as the inner and outer surface of the main frame 13, the top and side surface of the operator's cab 14, the inner and outer surface of the under guard 15, the inner and outer surface of the fender cover 16, the side surface of the front idler 17, the cylindrical surface of the final drive carrier 18, the underside surface of the blade 19, the top surface and the inner and outer surface of the blade supporting frame 20.

In an oil hydraulic excavator, though not illustrated, the lamination plates can be also applied to a bucket, an arm, a boom and the like, to say nothing of the same components as in the above bulldozer. Likewise in a wheel loader, the lamination plates are applicable to a bucket, a lift arm and the like. Further, in a dump truck, they can be also applied to a vessel and the like. Furthermore, irrespective of the types of construction equipment, the lamination plates are also applicable to an engine, a muffler and the like.

As explained thus far, according to the noise reducer for the construction equipment of the present invention, by bonding the lamination plates to the entire (specifically, the entire surface of the vibrating element or the vibration generating element itself) of or part of the noise generating element (vibrating element) at a predetermined interval, the vibrational energy is converted into thermal energy due to the friction and collisions between the vibrating element and the laminated plates, and between the laminated plates to thereby disperse, therefore making it possible to decrease vibration and reduce noise.

The lamination plates are bonded at a predetermined interval, in other words, discretely. Further, each of the lamination plates is discretely bonded to the noise generating element, the bond interval can be set so that the highest vibration reducing effect can be obtained according to the noise frequency band of each noise generating element. Specifically, if the bond interval is made larger, the noise reduction effect in the low to medium frequency band is enhanced, while if the bond interval is made smaller, the noise reduction effect in the medium to high frequency band can be enhanced. As a result, noise can be efficiently and minutely reduced according to the particular noise generating elements.

If the number of laminations is increased, the amount of noise reduction increases across the entire frequency band, and therefore by properly setting the number of laminations according to the noise level of a noise generating element, noise can be efficiently reduced.

Unlike the expensive vibration reducing material as in the prior art, a plain steel plate may be used as the lamination plates, therefore reducing cost and securing durability. Further, since the shape of each lamination plate is cut into an optional shape so as to be adapted to the shape of a member of which vibration is to be reduced of a noise generating element, and the lamination plates are bonded integrally or separately into a plurality of lamination plates, therefore enabling the bonding according to the space of a mounting location. Thereby, general versatility can be secured and noise can be surely reduced.

Further, since the energy dispersed by friction can be increased by increasing the friction coefficient of the lamination plates, the lamination plates can be adapted to the place, in which they are used, the purpose, and the like by selecting the surface-roughness of a steel plate, material of the lamination plates and the like.

In the lamination plates, the plate thickness of at least the uppermost plate may be larger than the other plates. Thereby, when thin lamination plates are sandwiched between a thick plate and a vibration element, the force of pressure is increased by the thick plate, the frictional forces between the vibrating element and the lamination plates and between the lamination plates increase, thus vibrational energy dispersed by friction is increased, and making it possible to further reduce noise.

The uppermost plate of the lamination plates may contain the momentum to press downward. Thereby, the uppermost plate of the lamination plates has the force of pressure, therefore increasing the frictional force of the lamination plates. Accordingly, the vibrational energy dispersed by friction increases, and a higher noise reduction effect can be obtained.

As for the means for bonding the lamination plates to a noise generating element, such bonding means as clamping with bolts, rivets and the like, plug welding, weld by spot welding and the like are used. Thereby, the most suitable bonding means can be selected in accordance with the quality of the material of noise generating element (vibrating element), use environments and conditions, vibrating conditions or the like, thus making it possible to efficiently reduce noise and facilitating an operation of attaching the lamination plates.

What is claimed is:

1. A noise reducer for construction equipment, comprising:
    a stack of at least two discrete, substantially smooth lamination plates bonded discretely at a plurality of locations, said locations having a predetermined interval, to a part of or the entire of a noise generating element of the construction equipment, wherein said lamination plates are bonded discretely to said noise generating element in a state in which entire faces of said lamination plates are in contact with said noise generating element.

2. The noise reducer for the construction equipment in accordance with claim 1, wherein the number of said discrete, substantially smooth lamination plates in said stack varies according to said noise generating element.

3. A noise reducer for construction equipment, comprising:

a stack of at least two discrete, substantially smooth lamination plates bonded discretely at a plurality of locations, said locations having differing intervals, to a part of or the entire of a noise generating element of the construction equipment, wherein said lamination plates are bonded discretely to said noise generating element in a state in which entire faces of said lamination plates are in contact with said noise generating element.

4. The noise reducer for the construction equipment in accordance with claim 3, wherein the number of said discrete, substantially smooth lamination plates in said stack varies according to said noise generating element.

5. A noise reducer for construction equipment, comprising:

a stack of at least two discrete, substantially smooth lamination plates bonded to a part of or the entire of a noise generating element of the construction equipment, wherein said lamination plates are bonded discretely to said noise generating element in a state in which entire faces of said lamination plates are in contact with said noise generating element, each stack of the lamination plates that is bonded to the noise generating element is placed at a discrete position.

6. The noise reducer for the construction equipment in accordance with claim 5, wherein the number of said discrete, substantially smooth lamination plates in said stack varies according to said noise generating element.

7. A noise reducer for construction equipment, comprising:

a plurality of stacks of at least two discrete, substantially smooth lamination plates bonded to a part of or the entire of a noise generating element of the construction equipment, wherein said lamination plates are bonded discretely to said noise generating element in a state in which entire faces of said lamination plates are in contact with said noise generating element, each stack of the lamination plates that is bonded to the noise generating element is placed at a discrete position, wherein each stack of lamination plates includes a plurality of similarly sized and shaped lamination plates, and the plates of different stacks are different in at least either size of shape.

* * * * *